US007099339B1

(12) United States Patent
Wang et al.

(10) Patent No.: US 7,099,339 B1
(45) Date of Patent: *Aug. 29, 2006

(54) APPARATUS, AND ASSOCIATED METHOD, FOR INTEGRATING OPERATION OF PACKET RADIO COMMUNICATION SYSTEMS

(75) Inventors: Jianhua Wang, Helsinki (FI); Arto Karppanen, Helsinki (FI); Marko Suoknuuti, Helsinki (FI); Jaakko Teinilä, Espoo (FI); Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1121 days.

This patent is subject to a terminal disclaimer.

(21) Appl. No.: 09/599,138

(22) Filed: Jun. 22, 2000

(51) Int. Cl.
*H04L 12/28* (2006.01)
*H04L 12/56* (2006.01)
*H04Q 7/00* (2006.01)
*H04Q 7/20* (2006.01)

(52) U.S. Cl. .................. 370/401; 455/433; 455/432.1; 370/328

(58) Field of Classification Search ................ 370/401, 370/315, 328, 331, 345, 336–338, 465–469, 370/347; 455/444, 436–438, 432.1, 426.1, 455/435.1, 445, 458, 432.3, 433, 432
See application file for complete search history.

(56) References Cited

U.S. PATENT DOCUMENTS 5,841,764 A * 11/1998 Roderique et al. .......... 370/310

| 5,958,006 | A  |   | 9/1999 | Eggleston et al. .......... 709/219 |
|-----------|----|---|--------|------------------------------------|
| 6,243,581 | B1 | * | 6/2001 | Jawanda .................. 455/432.2 |
| 6,389,008 | B1 | * | 5/2002 | Lupien et al. ............... 370/352 |
| 6,681,259 | B1 | * | 1/2004 | Lemilainen et al. ........ 709/250 |
| 6,725,036 | B1 | * | 4/2004 | Faccin et al. ............... 455/433 |
| 6,728,261 | B1 | * | 4/2004 | Sasson et al. ............... 370/466 |

FOREIGN PATENT DOCUMENTS

| WO | WO 99/16266    | 4/1999  |
| WO | WO 00/76145 A1 | 12/2000 |

OTHER PUBLICATIONS

Desimone, A., et al: "Wireless Data: Systems, Standards, Services", Wireless Networks, ACM, US, Oct. 1, 1995, pp. 241-253.
Bilgic, M., et al: "Quality of Service in General Packet Radio Service", International Workshop Multimedia Communications, Nov. 15, 1999, pp. 226-231.

* cited by examiner

*Primary Examiner*—Chi Pham
*Assistant Examiner*—Ronald Abelson
(74) *Attorney, Agent, or Firm*—Foley & Lardner LLP; G. Peter Albert (57) ABSTRACT

Apparatus, and an associated method, forms an integrated packet radio communication system. An integrated system is formed of portions of a GPRS system as well as portions of a WLAN system, such as that defined in the IEEE 802.11 standard. A WIP (WLAN Integrated Protocol) layer is defined, functionally positioned between upper-level, GPRS layers and lower-level, WLAN layers. Advantages of a GPRS system as well as advantages of the WLAN system are maintained in the integrated system.

15 Claims, 4 Drawing Sheets

APPARATUS, AND ASSOCIATED METHOD, FOR INTEGRATING OPERATION OF PACKET RADIO COMMUNICATION SYSTEMS

CROSS REFERENCE TO RELATED APPLICATIONS

The present application is related to U.S. patent application Ser. No. 09/599,136, filed on Jun. 22, 2002, the contents of which are incorporated by reference herein.

The present invention relates generally to a manner by which to integrate operation of packet radio communication systems to form an integrated communication system therefrom. More particularly, the present invention relates to apparatus, and an associated method, by which to combine operation of a first packet radio system, such as a WLAN (Wireless Local Area Network) defined pursuant to the IEEE 802.11 standard, with a second packet radio system, such as a system which provides for GPRS (General Packet Radio Service). Through operation of an embodiment of the present invention, advantages of a WLAN, such as high data rates and relatively inexpensive infrastructure, is provided while also providing global mobility and high security of a GPRS system.

BACKGROUND OF THE INVENTION

Usage of multi-user radio communication systems has become widely popular in recent years. Advancements in communication technologies have permitted the implementation, and portable utilization, of such communication systems, thereby to permit large numbers of users to communicate therethrough.

A radio communication system, similar to other types of communication systems, is formed of a sending station and a receiving station interconnected by way of a communication channel. In a radio communication system, a radio communication channel forms the communication channel. A radio communication channel is defined upon a portion of the electromagnetic spectrum.

In contrast, a communication channel defined in a wireline communication system is defined upon a wireline connection extending between the sending and receiving stations. Because a radio communication channel, defined upon a portion of the electromagnetic spectrum, is used to communicate data between the sending and receiving stations in a radio communication system, the need for a wireline connection to interconnect the sending and receiving station, required in a wireline communication system, is obviated. The mobility of communications in a radio communication system is inherently greater than that permitted in a typical wireline communication system.

Digital communication techniques have been implemented in radio, as well as other, communication systems. Digital communication techniques generally permit the communication system in which the techniques are implemented to achieve greater communication capacity than the capacity permitted in a communication system utilizes conventional, analog communication techniques.

A cellular communication system is exemplary of a communication system which is widely utilized and which regularly is constructed to make use of digital communication techniques. Communications in a cellular communication system generally are effectuated by way of mobile station carried by a user. A mobile station is a radio transceiver permitting two-way communication of radio signals with network infrastructure of the cellular communication system. The network infrastructure of the cellular communication system is connected, for instance, to a PSTN (Public-Switched, Telephonic Network), thereby to permit communication between the mobile station and a remote station, coupled to the PSTN.

A cellular communication system generally is operable over a fairly large geographical region, sometimes national or even extra-national in scope. A user of the mobile station is able to communicate by way of the cellular communication system when located at virtually any location encompassed by the cellular communication system. And, as the user, together with the mobile station, travels, handover of communications through successive portions of the network infrastructure of the cellular communication system permits continued communications by way of the mobile station.

At least one cellular communication system, the GSM (Global System for Mobile communications) cellular communication system includes the possibility that packet radio services pursuant to GPRS (General Packet Radio Service) shall permit the communication of digital data, packetized into packets of data. Communication of packet data pursuant to GPRS is effectuated at the same level of security, QoS (Quality of Service) level, and global mobility, as that provided for conventional GSM, cellular communications. Conventional proposals for GPRS messaging, however, permit only relatively low data communication rates for multimedia services, particularly when large numbers of users use the system to effectuate conventional cellular communications. Installation of a GPRS system is also relatively costly.

Digital communication techniques are also utilized in conventional LANs (Local Area Networks). LANs conventionally interconnect groups of computer work stations within an office areas or the like, to permit communications therebetween. Wireless networks, operable in manners analogous to wired LANs, referred to as WLANs (Wireless Local Area Networks), have also been developed and are utilized to communicate data over a radio link. Some of such systems are able to provide for voice, as well as nonvoice, communications.

One system, standards of which are set forth in the IEEE 802.11 specification, provides for fast data communications in a WLAN. A WLAN system constructed pursuant to the IEEE 802.11 standard provides a relatively quick data rate to effectuate communication of data as well as a relatively simple infrastructure. However, in contrast to GPRS systems, lessened security provisions are implemented. Additionally, a WLAN inherently does not provide wide-area mobility. If a manner could be provided by which to integrate operation of a GPRS system and a WLAN system, incorporating the advantages of each, the resultant, integrated system would advantageously provide an improved communication system.

It is in light of this background information related to radio communication systems that the significant improvements of the present invention have evolved.

SUMMARY OF THE INVENTION

The present invention, accordingly, advantageously provides apparatus, and an associated method, by which to integrate operation of packet radio communication systems to form an integrated system.

In one aspect of the present invention, a manner is provided by which to combine operation of a first packet radio system, such as a WLAN (Wireless Local Area Network) defined pursuant to the IEEE 802.11 standard with a packet radio communication system, such as a system which provides for GPRS (General Packet Radio Service). A resultant, integrated system is provided therefrom. Through operation of various embodiments of the present invention, data transport and mobility management are both provided for in the integrated system.

A WLAN system constructed to comply with the parameters set forth in the IEEE 802.11 standard provides for the communication of packet data at relatively quick data rates and requires the use of only relatively simple infrastructure installations. And, a GPRS system constructed to comply with the parameters set forth in an appropriate GPRS standard provides for the communication of packet data in a manner which provides relatively high levels of security pursuant to a QoS (Quality of Service) structure, while also maintaining high levels of mobility of communications as a GPRS system is generally installed in over a large geographical area. A WLAN system, in contrast, fails to provide wide-area mobility, security, and QoS support provided in a GPRS system. And, a GRPS system requires relatively costly infrastructure investments while providing relatively low data rates. Generally, the advantages inherent in a WLAN system are also the disadvantages of a GPRS system, and the advantages of a GPRS system are also the disadvantages of a WLAN system. The integrated system provided for through an embodiment of the present invention advantageously makes use of the advantageous aspects of both the WLAN and GPRS system, thereby to provide an integrated system of improved characteristics.

In one aspect of the present invention, the communication system is defined in terms of logical layers. The integrated system of an embodiment of the present invention includes a logical layer, referred to as a WIP (WLAN Integration Protocol) layer positioned between lower layers and upper-level layers. The lower layers are formed of existing layers defined in the WLAN protocol, and the upper-level layers are formed of existing logical layers defined in the GPRS protocol. The WIP layer integrates the layers defined in the separate systems so that data generated by an upper-level layer is communicated through the lower-level layers in a transparent manner while maintaining the operational features of communications in the separate communication systems.

In another aspect of the present invention, a WIP layer is provided at a mobile station operable in a packet radio communication system constructed pursuant to an embodiment of the present invention. The WIP layer is positioned between upper-level, GPRS-compliant layers and lower-level, WLAN-compliant layers.

In another aspect of the present invention, an interworking element (IWE) is provided as an interface between structure of a WLAN and structure of a packet data network. The IWE is defined in terms of logical layers, and lower-level, WLAN-compliant layers.

In one implementation, the interworking element is formed of a modified SGSN (Serving GPRS Service Node). The interworking element is coupled by way of an Ethernet hub to a series of access points, defined in the WLAN system. Functional operation of the WIP layer provides for mobility management in the integrated GPRS-WLAN system. Functions such as cell ID mapping, cell ID acquisition, paging, communication of messages needed for such functions, and PDU definitions, identifier mapper within the WIP protocol, and suspend/resume service function, are all provided through operation of the WIP layer of an embodiment of the present invention.

In these and other aspects, therefore, the present invention provides an integrator, and an associated method, for a packet radio communication system for communicating packet data. The integrator integrates operation of a first packet data system having at least a first packet-data-system element with operation of a second packet data system having at least a second packet-data-system element, thereby to form an integrated system of the packet radio communication system. An integration element is at least functionally coupled between the first packet-data-system element and the second packet-data-system element. The packet data of any selected information-element type is of a plurality of element types defined in either of the first packet data system and the second packet data system.

A more complete appreciation of the present invention and the scope thereof can be obtained from the accompanying drawings, which are briefly summarized below, the following description of the presently-preferred embodiment of the invention, and the appended claims.

DETAILED DESCRIPTION OF THE PREFERRED EMBODIMENT

Figure 1:
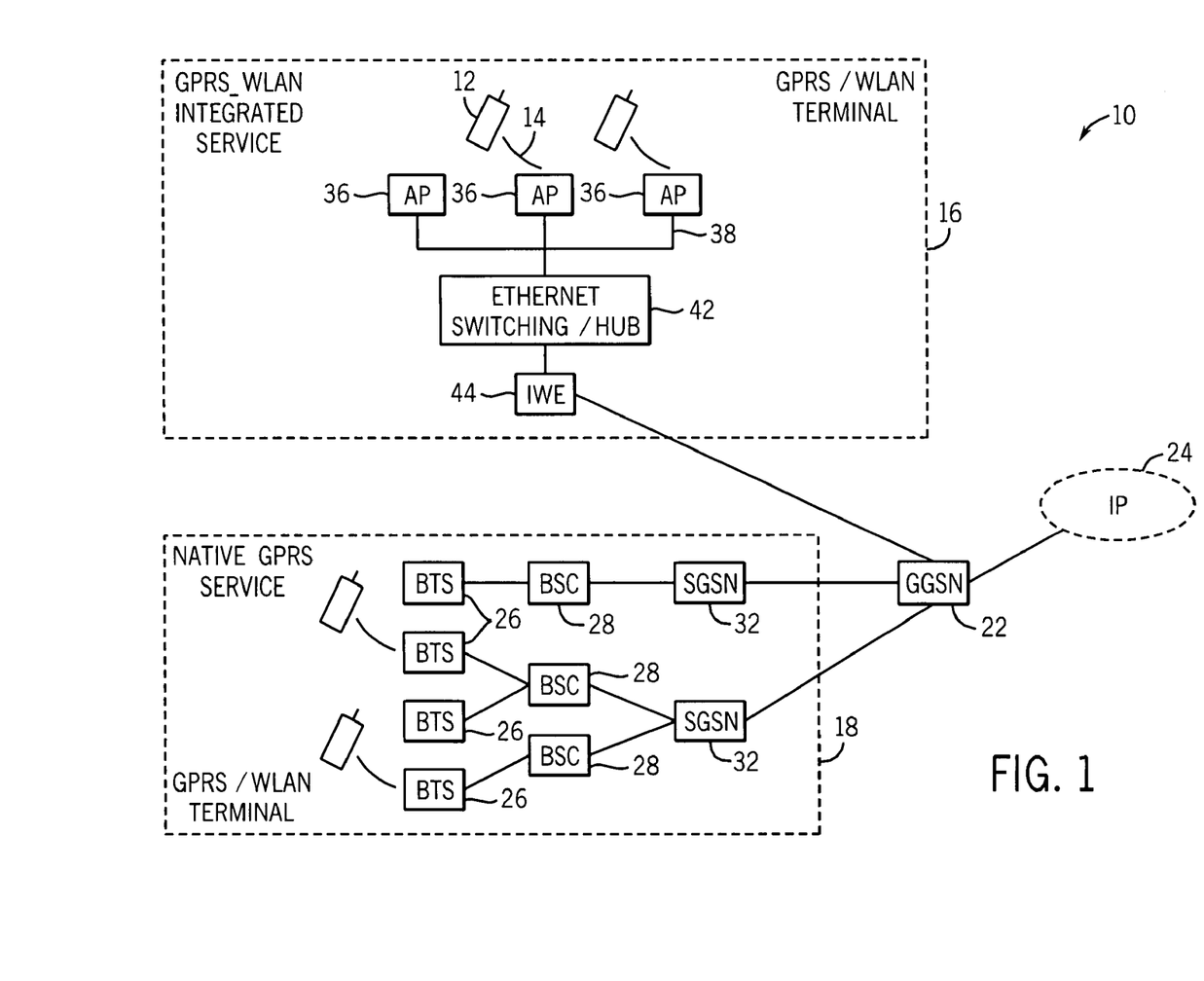
FIG. 1 illustrates a functional block diagram of a packet radio communication system in which an embodiment of the present invention is operable.

Referring to FIG. 1, a communication system, shown generally at 10, is operable to provide radio packet service with a mobile station, such as any of the mobile stations 12. In the exemplary implementation, a two-way communication of packet data is provided. That is to say, forward-link packets of data are transmitted to the mobile station and reverse-link packets of data are sent by the mobile station, both by way of radio links 14.

The mobile stations 12 are capable of movement, such as their carriage by a user. While initially positioned at a first location, a mobile station may thereafter be repositioned to be located at a second location, all within a geographical area encompassed by fixed infrastructure of the communication system.

Here, the fixed infrastructure is divided into two portions, a first portion 16 and a second portion 18. The first portion 16 is formed pursuant to an embodiment of the present invention, here an integrated system formed of a GPRS system and a WLAN system integrated theretogether. And, the second portion 18 is formed of a conventional GPRS system. Both the first and second portions 16 and 18 coupled to a GGSN (Gateway GPRS Service Node) 22 which, in turn, is connected to an IP (Internet Protocol), or other packet data, network 24.

The conventional GPRS system formed of the second portion 18 includes a plurality of Base Transceiver Stations (BTSs) 26. Each of the base transceiver stations defines a coverage area, e.g., one or more cells, within which radio links with mobile stations 12 are formable and between which handover of communications are effectuable as a mobile station moves through successive coverage areas during a communication session. Sets of the base transceiver stations are coupled to base station controllers 28 which are operable, in conventional manner, to control operation of the base transceiver stations. And, in turn, sets of the base station controllers are coupled to SGSNs (Serving GPRS Service Nodes) 32. Each SGSN is coupled to the GGSN 22. The GPRS system is operable pursuant to an appropriate GRPS standard to communicate packet-switched data between a mobile station 12 and another communication station. The GPRS system is, for instance, constructed together with a GSM (Global System for Mobile Communications) cellular communication system in which communication stations must be authenticated prior to permission to communicate by way of the communication system. A high level of security is thereby provided in communications pursuant to a conventional GPRS or GSM-GPRS communication system.

The GPRS communication system portion 16 constructed pursuant to an embodiment of the present invention includes a plurality of spaced-apart access points 36 positioned throughout an area to be encompassed by the system portion 16. Each of the access points 36 defines a coverage area within which radio links 14 are formable with mobile stations 12 and pursuant to which communications are effectuable. The access points are connected to one another by way of lines 38 and to, here, an Ethernet switching hub 42. The Ethernet switching hub, in turn, is coupled to an IWE (Interworking Element) 44. And, the IWE 44 is connected to the GGSN 22. During a communication session, packet-switched communications are permitted with a mobile station 12. Here, the communications are effectuated over the radio links 14 in manners set forth in the IEEE 802.11 standard, or the like.

The integrated system of which the portion 16 is formed includes advantageous features of both the GPRS and the WLAN systems. Because communications over the radio links 14 are made in conformity with the WLAN standard, the high data rates and low infrastructure costs associated with the WLAN system are maintained. And, as other features of the GPRS system are maintained, the integrated communication system portion 16 provides the advantages of both a WLAN system and the GPRS system.

The IWE 44, as well as the construction of the mobile station 12, provides for the integration of the WLAN and GPRS systems. The functional positioning of the IWE in the Figure between the Ethernet switching hub 42 and the GGSN 22 is exemplary. Alternately, a fixed-site radio transceiver could be modified to perform the functions of the IWE. Alternately, in other implementations, the integrated communication system portion could include elements of the fixed network infrastructure of a conventional GPRS system in which the functionality of the IWE is embodied in a base transceiver station, a base station controller, or a SGSN of such a system. Also, the functionality of the IWE could be embodied in an access point 36, or distributed amongst several access points.

Figure 2:
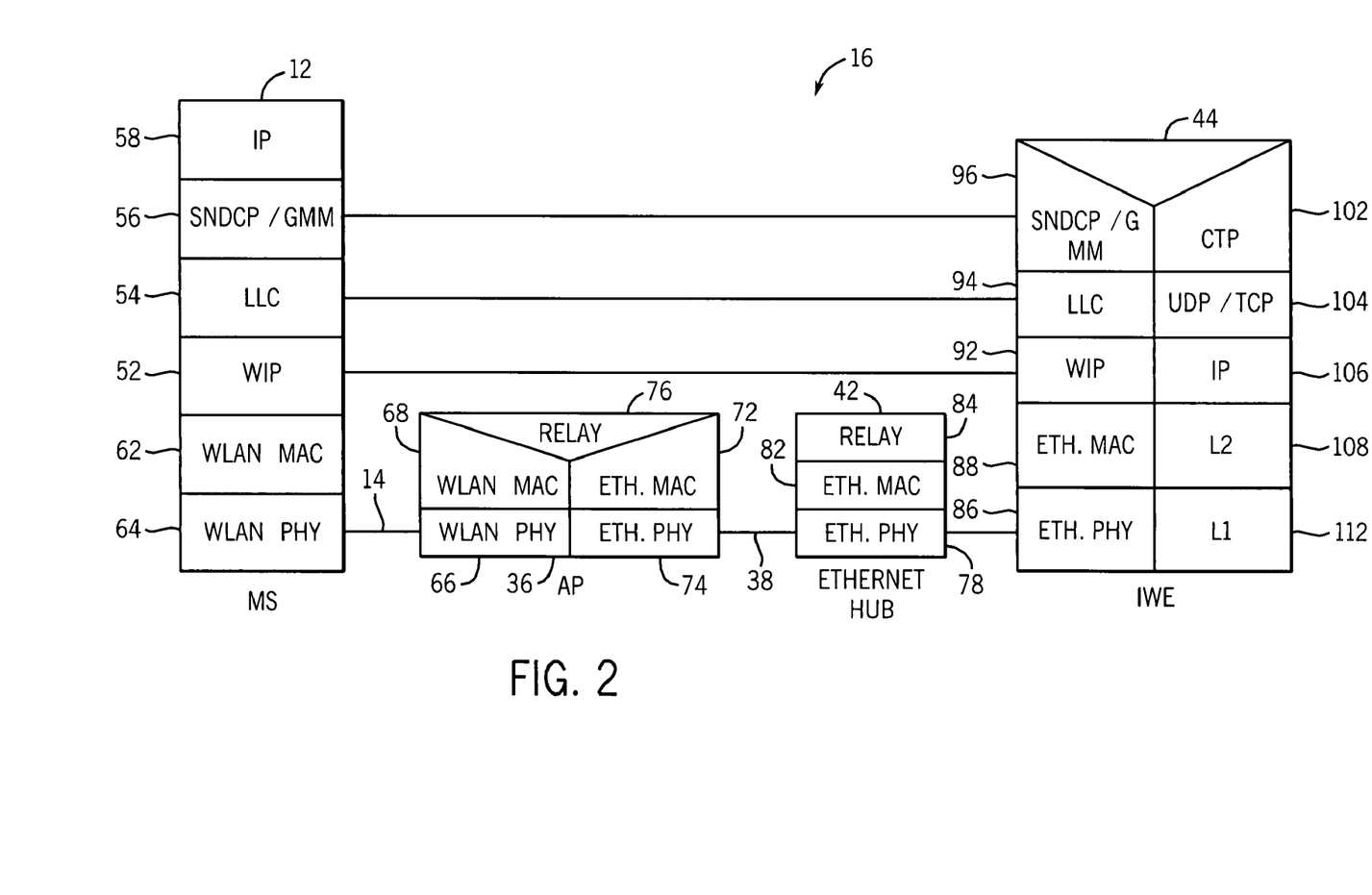
FIG. 2 illustrates a logical layer diagram showing portions of the integrated communication system forming a portion of the communication system shown in FIG. 1.

FIG. 2 illustrates the first communication system portion 16 in logical-layer form. Here, a single mobile station 12 is represented, and also a single access point 36 of the fixed network infrastructure of the communication system portion is also represented. And, the Ethernet switching hub 42 and the IWE 44 of the fixed infrastructure of the communication system portion is again illustrated in the Figure.

The mobile station 12 includes a logical layer, a WIP (WLAN Integration Protocol) layer 52 positioned between upper-level layers 54, 56, and 58, and lower-level layers 62 and 64. The layers 54–58 form LLC, SNDCP/GMM, and IP layers, all as defined pursuant to an appropriate GPRS standard. And, the layers 62 and 64 form WLAN MAC and WLAN PHY layers, respectively. The layers 62 and 64 are functionally operable as described in the IEEE 802.11 standard.

The access point 36 includes WLAN PHY and WLAN MAC layers 66 and 68, respectively, corresponding to the layers 64 and 62 of the mobile station. The access point is further shown to include Ethernet MAC and Ethernet PHY layers 72 and 74 functionally connected by way of a relay 76.

The Ethernet switching hub 42 includes an Ethernet PHY layer 78 and an Ethernet MAC layer 82 as well as a relay function 84. And, the interworking element 44 also includes an Ethernet PHY layer 86 and Ethernet MAC layer 88 corresponding to the layers 78 and 82. A WIP logical layer 92 of an embodiment of the present invention is also shown to form a portion of the interworking element. The layer 92 is positioned between the lower-level layers 86 and 88 and upper-level layers 94 and 96. The layer 94 forms a LLC layer, and the layer 96 forms a SNDCP/GMM layer. The interworking element also includes a GTP layer 102, a UDP/TCP layer 104, an IP layer 106, and L2 and L1 layers 108 and 112.

Because the upper-level layers correspond to GPRS functional layers, the mobility management, authentication, security, user data encryption, and user data compression all provided pursuant to operation of such upper-level layers are again provided in the integrated system. On the radio interface 14, the GPRS LLC, and higher, layers are again utilized in the integrated system while the lower-level layers correspond to the layers of a WLAN system by which to transmit signaling and user data.

The WIP layers 52 and 92 provide for the performance of various functions, including the relaying of packet data between the upper-level layers and the lower-level layers. Additionally, the WIP layers provide for the transport of TLLIs (Temporary Logical Link Identifiers) and to insert a cell identifier into uplink data.

Figure 3:
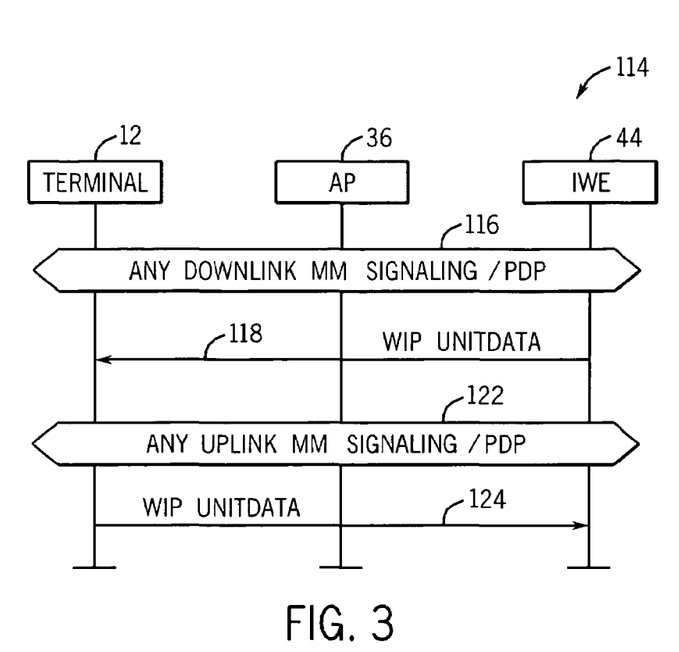
FIG. 3 illustrates a message sequence diagram representing signaling associated with data transfer during operation of the integrated communication system portion shown in FIG. 2.

A message sequence diagram, shown generally at 114 in FIG. 3, represents the transport of data in a connectionless, unacknowledged mode of operation. Signaling between a mobile station 12, an access point 36, and the interworking element 44 are represented in the sequence diagram. As the upper-level GPRS layers provide various levels of acknowledgment modes for supporting reliable user data transfer, an acknowledgment mode is not necessary in the WIP layer. Accordingly, the WIP layer provides a relay protocol in which data is not separated by type. That is to say, the WIP layer does not separate LLC PDUs and MM signaling. And, as a result, both are transportable by a UNITDATA PDU. As illustrated in the sequence diagram 114, any downlink MM signaling/PDP is transferable, indicated by the segment 116 between the IWE 44 and the mobile station 12. Thereafter, a WIP UNITDATA message, indicated by the line segment 118, is transmittable by the IWE 44 to the mobile station. The segment 118 represents a downlink transmission. Any uplink MM signaling/PDP is analogously represented by the segment 122. Thereafter, an uplink message forming a WIP UNITDATA message, represented by the segment 124, is transmittable by the mobile station 12 to the IWE. The UNITDATA forming the downlink or uplink transmission is of any selected type, such as a PDU type, a TLLI value, a QoS profile, an IMSI value, an alignment octet, or a LLC-SDU.

To utilize the mobility management provided pursuant to a GPRS system, GPRS location management is mapped to the integrated system. Here, every WLAN AP is mapped to a GPRS cell. Every AP, thereby, has a unique cell ID number. In the exemplary implementation, mapping is performed at the WIP layer within the IWE 44. The IWE includes a static table which maps every AP ID, e.g., a 48-bit MAC address, to a cell ID.

Figure 4:
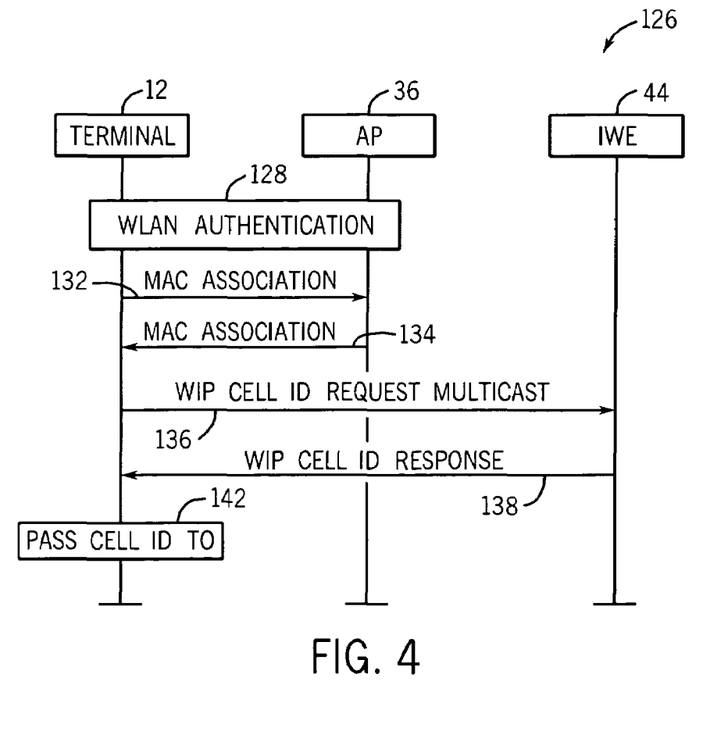
FIG. 4 illustrates a message sequence diagram representing signaling generated during operation of the integrated communication system portion shown in FIG. 2 during WLAN association operations and cell ID operations.

FIG. 4 illustrates a message sequence diagram 126 which represents operation of the integrated communication system portion to perform the functions of identifying a current serving cell ID. The functions performed by the WIP layer are analogous to the operations performed in the GPRS system by which a mobile station selects and identifies its current serving cell by a cell selection and reselection procedure. Analogously, in the integrated communication system portion, the mobile station is capable of moving between access points 36. While moving, the mobile station performs WLAN association, reassociation, and deassociation operations with successive ones of the access points.

The message sequence diagram illustrates signaling between the mobile station 12, and access point 36, and the interworking element 44. WLAN authentication procedures are indicated by the segment 128. Once authentication procedures have been completed, the mobile station sends a MAC association message, indicated by the segment 132, to the access point. Responsive thereto, the access point returns a corresponding MAC association message, here designated by the segment 134. Then, and as indicated by the segment 136, the mobile station sends a WIP cell ID request multicast message, by way of the access point 36 to the interworking element 44. And, responsive thereto, the IWE returns a response message, indicated by the segment 138 to the mobile station. Then, and as indicated by the segment 142, the mobile station passes on the cell ID. The messages indicated by the segments 132–134 correspond with standard WLAN association procedures set forth in the IEEE 802.11 standard.

The messaging represented in the message sequence diagram makes use of the Ethernet multicast and broadcast service by which to define a MAC multicast address for sending a cell ID request PDU to the interworking unit 44. All mobile stations and interworking units 44 in the communication system portion should belong to the multicast group. The access point 36, however, is not required to belong to the multicast group as the access point do not understand the message indicated by the segments 136 and 138. After the interworking element 44 sends the response message 138, the interworking element functions to record the MAC address of the mobile station and the cell ID associated therewith in a converting table. The converting table is used to insert the cell ID to uplink data.

The WIP layer of the interworking element knows the MAC address for each WIP PDU received thereat. A mapping table containing the MAC address of the associated mobile station, the cell ID associated therewith, as well as the interworking element, is able to search for the cell ID of the sending mobile station according to the MAC address of the sending mobile station. The interworking element passes the cell ID from which the LLC SDU is associated together with the LLC SDU to the appropriate LLC layer. Thereby, analogous to operation in a GPRS system, the function of the BSS GP layer enables the SGSN to know from which cell a LLC SDU originates. The location of the mobile station is updated to the SGSN by checking the cell ID accompanied with the LLC SDU.

The WIP layer further fulfills the requirement that a TLLI (Temporary Logic Link Identifier) is transportable from a LLC layer to a lower-level layer. Such transport is performed by encoding the TLLI field in a UNITDATA PDU, as noted previously with respect to the messaging indicated with respect to FIG. 2.

Figure 5:
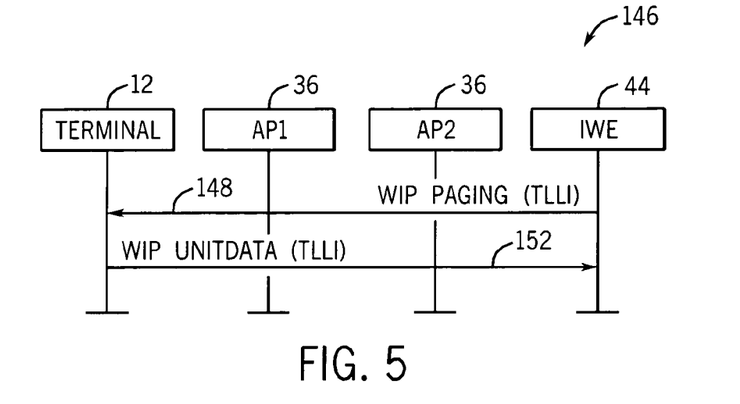
FIG. 5 illustrates a message sequence diagram representing signaling generated during operation of an embodiment of the present invention during the performance of paging operations.

Paging is also performed pursuant to operation of the WIP layer. Paging is a basic function of the GPRS system. FIG. 5 illustrates a message sequence diagram, shown generally at 146, and shows the messaging transported between the mobile station 12 and the interworking element 44 by way of access points 36. A page message, WIP PAGING, is indicated by the segment 148, sent by the interworking element to the mobile station 12. Responsive to detection at the mobile station of the paging message, a WIP-layer UNITDATA message, utilizing a TLLI is returned to the interworking element. The message is indicated by the segment 152 shown in the Figure.

The paging procedure provides a manner by which the interworking element 44 identifies the cell in which the mobile station is located. If the mobile station is within the coverage area of the interworking element, the interworking element is always aware of the cell in which the mobile station is located by effectuation of the WLAN association and cell ID inquiry procedure, noted previously. The paging procedure described here with respect to FIG. 4 fulfills a GPRS GMM layer requirement.

Figure 6:
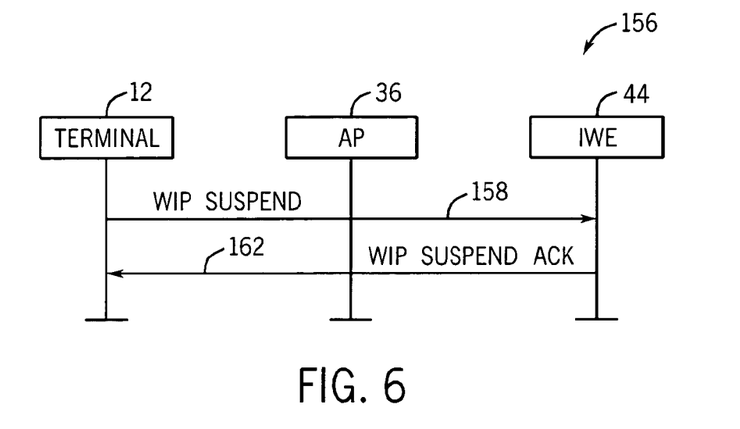
FIG. 6 illustrates a message sequence diagram representing signaling generated during operation of an embodiment of the present invention in which a mobile station requests a suspension of data transfer.

FIG. 6 illustrates a message sequence diagram, shown generally at 156. Again, messaging of signals transported between a mobile station and an interworking element 44, by way of an access point 36, is again represented. In the GPRS system, suspend and resume messages are used by the mobile station to order the LLC layer to suspend, or resume, frame transmission. The WIP layer provides this functionality without necessitating alteration of the LLC layer. A WIP SUSPEND message, indicated by the segment 158, is sent by the mobile station to the interworking element. Responsive thereto, the interworking element returns an acknowledgment message, indicated by the segment 162. Receipt at the interworking element 44 of a SUSPEND PDU indicates that the mobile station wants to suspend its GPRS WLAN integrated service. The acknowledgment response is returned to provide a positive acknowledgment of the suspension.

Figure 7:
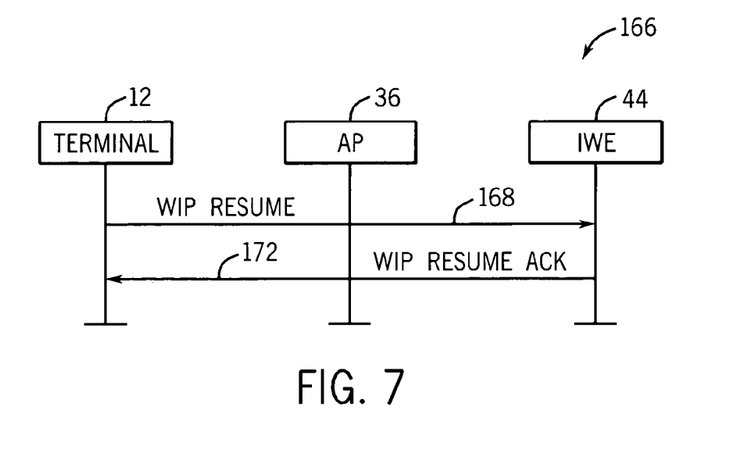
FIG. 7 illustrates a message sequence diagram representing signaling generated during operation of an embodiment of the present invention in which the mobile station requests resumption of communication of packet data with the mobile station.

FIG. 7 illustrates a message sequence diagram, shown generally at 166, here representing messaging of signals between the mobile station 12 and the interworking element 44 to resume communications subsequent to a suspension to communication. Here, a WIP RESUME message is generated, indicated by the segment 168, is sent by the mobile station to the interworking element 44. Responsive thereto, the interworking element returns an acknowledgment message, indicated by the segment 172.

By implementing the PDU-based messages described in the preceding figures, the integrated communication system portion is able to support basic packet data service with the speedy WLAN radio part as well as providing wide area mobility management and security pursuant to the GPRS part.

The previous descriptions are of preferred examples for implementing the invention, and the scope of the invention should not necessarily be limited by this description. The scope of the present invention is defined by the following claims.

We claim:

1. In a method for communicating packet data in a radio communication system having a network infrastructure including a first fixed-site transceiver and at least a second fixed-site transceiver with which a mobile station is selectably connectable by way of a radio link, an improvement of a method for integrating operation of a first packet data system having at least a first packet-data-system element with operation of a second packet data system having at least a second packet-data-system element, thereby to form an integrated system of the packet radio communication system, said method comprising:

mapping identities of the first and at least second fixed-site transceivers defined in the first packet data system to corresponding identities defined in the second packet data system;

relaying packet data between the first packet-data-system element and a selected one of the first and at least second fixed-site transceivers, the packet data of any selected information-element type of a plurality of element types defined in either of the first packet data system and the second packet data system.

2. A method for integrating operation of a first packet data system with a WLAN, interconnected by way of an interworking element the first packet data system having at least a first fixed-site transceiver and a second fixed-site transceiver, and the WLAN having a first access point and a second access point, a mobile station connectable to at least one of the WLAN and the first packet data system by way of a radio link, said method comprising the operations of:

mapping identities of the first and second fixed-site transceivers defined in the first packet data system to the first and second access points, wherein said operation of mapping comprises indexing the identities of the first and second fixed site transceivers defined in the first packet data system against the identities of the first and second access point defined in the WLAN;

performing association operations to form radio links with the access points;

performing cell identification request operations selectable to identify the mobile station to the interworking element; and relaying packet data between the first packet data system and the WLAN, the packet data of any selected information-element type of a plurality of element types defined in either of the first packet data system and the WLAN.

3. An integrator for a packet radio communication system defined in terms of logical layers, said integrator for integrating operation of a GPRS system having at least a first GPRS-system logical layer and and IEEE 802.11 standard-compliant WLAN having at least a second WLAN-system logical layer, said integrator comprising:

a WLAN integration protocol layer logically positioned beneath the GPRS-system logical layer and above the WLAN-system logical layer, said integration logical layer for relaying packet data between the GPRS-system logical layer and the WLAN system logical layer, the packet data of any selected information-element type of a plurality of element types defined in either of the GPRS system and the IEEE 802.11 standard-compliant WLAN system.

4. An integrator for integrating operation of a first packet data system with a WLAN, interconnected by way of an interworking element (IWE), the first packet data system having a first fixed-site transceiver and a second fixed-site transceiver, and the WLAN having a first access point and a second access point, a mobile station connectable to at least one of the WLAN and the first packet data system by way of a radio link, said integrator comprising:

an integration element functionally coupled between the first packet data system and the WLAN, said integration element configured to relay packet data therebetween, the packet data of any selected information-element type of a plurality of element types defined in either of the first packet data system and the WLAN, said integration element configured to map identities of the first and second fixed-site transceivers to the first and second access points, a first portion of said integration element embodied at the mobile station, said first portion for performing association operations to form radio links with the access points and for performing cell identification request operations selectably to identify the mobile station to the interworking element.

5. The integrator of claim 4 wherein a second portion of said integrator is embodied at the IWE.

6. The integrator of claim 1 wherein said integration element comprises a memory element forming a table, the table containing the identities of the first and second fixed site transceivers defined in the first packet data system and, indexed thereagainst, the identities of the first and second access points defined in the WLAN.

7. The integrator of claim 4 wherein the cell identification request operations further associate the mobile station with a cell identifier, the cell identifier defined pursuant to the first packet data system.

8. The integrator of claim 7 wherein said IWE further comprises a table, the table for storing indications of an identity of the mobile station and the cell identifier, the cell identifier indexed against the identity of the mobile station.

9. The integrator of claim 8 wherein the mobile station is identified by a MAC address.

10. The integrator of claim 9 wherein the first packet-data-system comprises a LLC logic layer and wherein said integration element further transports a Temporary Logic Link Identifier (TLLI) between the LLC logic layer and the WLAN.

11. The integrator of claim 10 wherein said integration element further generates a page message to page the mobile station, the page message generated at an access point of the first and second access points corresponding to the cell identifier identified in the table formed at said IWE.

12. The integrator of claim 11 wherein the first portion of said integration element located at the mobile station responds to the page message with a response message, the response message including indications of the TLLI, the TLLI identifying the mobile station.

13. The integrator of claim 11 wherein the first portion of said integration element located at the mobile station further selectably transmits a communication suspend message to the IWE, the communication suspend message for requesting suspension of communication of data to the mobile station.

14. The integrator of claim 13 wherein the first portion of said integration element located at the mobile station further selectably transmits a communication resume message to the IWE, the communication resume message for requesting resumption of communication of data to the mobile station.

15. A method for a packet radio communication system defined in terms of logical layers, said method for integrating operation of a GRPS system having at least a first GPRS-system logical layer and an IEEE 802.11 standard-compliant WLAN having at least a second WLAN-system logical layer, said method comprising:

logically positioning a WLAN integration protocol layer beneath the GPRS-system logical layer and above the WLAN-system logical layer;

relaying packet data between the GPRS-system logical layer and the WLAN-system logical layer, the packet data of any selected information-element type of a plurality of element types defined in either of the GPRS system and the IEEE 802.11 standard-compliant system.

* * * * *